US012676039B2

(12) United States Patent
Mitra et al.

(10) Patent No.: US 12,676,039 B2
(45) Date of Patent: Jul. 7, 2026

(54) ACCESS CONTROL PROCESS FOR A RESTRICTED AREA USING A HEARING DEVICE

(71) Applicant: Sivantos Pte. Ltd., Singapore (SG)

(72) Inventors: Subhasri Mitra, Erlangen (DE); Michael Blendinger, Erlangen (DE); Andreas Pfrommer, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 111 days.

(21) Appl. No.: 18/675,409

(22) Filed: May 28, 2024

(65) Prior Publication Data

US 2024/0395092 A1 Nov. 28, 2024

(30) Foreign Application Priority Data

May 26, 2023 (DE) ..................... 10 2023 204 984.8

(51) Int. Cl.
*G07C 9/28* (2020.01)

(52) U.S. Cl.
CPC ...................................... *G07C 9/28* (2020.01)

(58) Field of Classification Search
CPC ............ G07C 9/28; G07C 2009/00968; H04R 25/00; H04R 2225/43
See application file for complete search history.

(56) References Cited

U.S. PATENT DOCUMENTS

| | | | | |
|---|---|---|---|---|
| 2014/0211973 | A1* | 7/2014 | Wang | H04W 8/005<br>381/315 |
| 2019/0135229 | A1* | 5/2019 | Ledvina | H04W 12/64 |
| 2023/0347846 | A1* | 11/2023 | Ette | G01S 13/765 |
| 2025/0026307 | A1* | 1/2025 | Palakonda | G07C 9/00309 |

FOREIGN PATENT DOCUMENTS

| | | | |
|---|---|---|---|
| CN | 212890239 | U | 4/2021 |
| CN | 113313864 | A | 8/2021 |
| EP | 2760225 | A1 | 7/2014 |
| WO | 2022100257 | A1 | 5/2022 |
| WO | 2022215993 | A1 | 10/2022 |

OTHER PUBLICATIONS

English Translation of CN 113313864 A (Year: 2021).*

* cited by examiner

*Primary Examiner* — Nabil H Syed
(74) *Attorney, Agent, or Firm* — Laurence A. Greenberg; Werner H. Stemer; Ralph E. Locher

(57) ABSTRACT

An admission control method for a restricted-admission area uses a hearing apparatus having an ultra-wideband communication device. An area-affiliated narrowband communication device checks for presence of the hearing apparatus, which likewise has a narrowband communication device. Upon detecting the hearing apparatus, an ultra-wideband communication connection between an area-affiliated ultra-wideband communication device and the hearing-apparatus-affiliated ultra-wideband communication device is established. An admission authorization associated with the hearing apparatus is checked for and the ultra-wideband communication connection is a basis for ascertaining a distance of the hearing apparatus from the restricted-admission area. If the admission authorization of the hearing apparatus exists and the hearing apparatus is disposed within a predefined distance from the restricted-admission area, the admission restriction is at least temporarily lifted. An admission control system and a hearing apparatus are also provided.

15 Claims, 2 Drawing Sheets

ACCESS CONTROL PROCESS FOR A RESTRICTED AREA USING A HEARING DEVICE

FIELD AND BACKGROUND OF THE INVENTION

The invention relates to an admission control method for a restricted-admission area using a hearing apparatus. Moreover, the invention relates to an admission control system and a hearing apparatus.

Hearing apparatuses are normally used to output an audio signal to the hearing of the wearer of this hearing apparatus. The output is provided by means of an output transducer, usually acoustically by way of airborne sound by means of a loudspeaker (also referred to as a "receiver"). Such hearing apparatuses are often used as so-called hearing aids. To this end, the hearing apparatuses usually comprise an acoustic input transducer (in particular a microphone) and a signal processor, which is configured to use at least one signal processing algorithm, normally stored on a user-specific basis, to process the input signal (also: microphone signal) generated by the input transducer from the ambient sound in such a way that a hearing loss of the wearer of the hearing apparatus is at least partially compensated for. In particular in the case of a hearing aid, the output transducer may be not only a loudspeaker but also alternatively a so-called bone conduction receiver or a cochlear implant, which are configured to mechanically or electrically couple the audio signal into the hearing of the wearer. The term "hearing apparatuses" additionally covers in particular also devices such as e.g. so-called tinnitus maskers, headsets, headphones and the like.

Typical designs of hearing apparatuses, in particular hearing aids, are behind-the-ear ("BTE") and in-the-ear ("ITE") hearing apparatuses. These names are geared to the intended wearing position. As such, behind-the-ear hearing apparatuses have a (main) housing that is worn behind the pinna. A distinction can be drawn here between models whose loudspeaker is arranged in this housing—the sound output to the ear is normally provided by means of a sound tube worn in the auditory canal—and models that have an external loudspeaker placed in the auditory canal. By contrast, in-the-ear hearing apparatuses have a housing that is worn in the pinna or even completely in the auditory canal.

Restricted-admission areas are intended to be understood to mean for example premises such as residences and offices, but also motor vehicles. In particular in the case of the latter, fewer and fewer conventional keys needing to be used to mechanically unlock a lock are being used. Even in the case of premises, however, locks for which a conventional key is no longer used, but rather a keycard (as often in hotels) or another transponder, for example, are also now used. The transponder may be in the form of a separate key means. Alternatively, however, a smartphone can also be used, since a smartphone often has short-range communication means (e.g. near field communication "NFC", Bluetooth Low Energy "BLE" or the like) that are used to permit digital key signatures to be exchanged with a lock-affiliated controller.

SUMMARY OF THE INVENTION

The invention is based on the object of improving the admission control for a restricted-admission area.

This object is achieved according to the invention by way of an admission control method having the features described below. In addition, this object is achieved according to the invention by way of an admission control system having the features described below. Additionally, this object is achieved according to the invention by way of a hearing apparatus having the features described below. Other embodiments and further developments that are advantageous and in some cases inventive by themselves are outlined in the subclaims and the description that follows.

The admission control method according to the invention is used for controlling admission to a restricted-admission area (i.e. near or for such an area) using two hearing apparatuses. Preferably, the hearing apparatuses are each a hearing aid. Each of the hearing apparatuses has an ultra-wideband communication device and also a narrowband communication device. The method first of all involves using an area-affiliated narrowband communication device (i.e. one associated with the restricted-admission area) to check for the presence of the hearing apparatuses. In the event of the presence of the hearing apparatuses being detected as a result of this, an ultra-wideband communication connection is established (i.e. set up) between an area-affiliated ultra-wideband communication device and the hearing-apparatus-affiliated ultra-wideband communication device. Furthermore, an admission authorization associated with the hearing apparatuses is checked for. The ultra-wideband communication connection is additionally taken as a basis for ascertaining a distance of the hearing apparatuses from the restricted-admission area. If the admission authorization of the hearing apparatuses exists and the hearing apparatuses are arranged within a predefined distance from the restricted-admission area, the admission restriction is then at least temporarily lifted.

This approach has the advantage that modern hearing apparatuses often already have a narrowband communication device that is used to communicate with other devices. In the method described hereinabove, a narrowband communication connection to the other device that has been established by means of the narrowband communication device is preferably used as a type of wakeup function for the ultra-wideband communication device. In particular, the ultra-wideband communication device of the hearing apparatuses (and in particular also the area-affiliated ultra-wideband communication device) is thus activated if the narrowband communication connection between the restricted-admission area and the hearing apparatuses is established. Optionally, the ultra-wideband communication device is activated by additionally also transmitting an activation command, in particular from the area-affiliated narrowband communication device to the hearing apparatuses, that is to say specifically to the narrowband communication device thereof, on the basis of which the hearing apparatuses activate the ultra-wideband communication device thereof. As such, the ultra-wideband communication device of the hearing apparatuses does not have to be constantly active, and so energy can be saved as a result of this. By contrast, the ultra-wideband communication device has the advantage that it can be operated in a comparatively energy-saving manner during communication, i.e. during data interchange. In particular, the ultra-wideband communication device can be operated with particularly low power draw, compared with the narrowband communication device, of less than 10 mW, in particular of less than 7 mW, preferably less than 5 mW, 2 mW or 1.5 mW, and particularly preferably of less than 1 mW.

In one preferred method variant, the distance of the hearing apparatuses from the restricted-admission area is ascertained by means of a signal propagation time measurement. This allows comparatively secure admission control, in particular admission control protected against unauthorized access. Attacks by third parties that, by way of example, use signal amplification are sometimes successful in the case of hitherto customary narrowband communication connections, since they sometimes rely on signal strength as a measure of the distance. An intervention by third parties routinely does not work in the case of a signal propagation time measurement, however, since it would result in an implausible latency being impressed on the ultra-wideband signal.

Alternatively, the distance of the hearing apparatuses from the restricted-admission area is ascertained on the basis of a so-called signal angle of arrival of a signal transmitted using the ultra-wideband communication connection. This can be employed in particular when two—in particular area—affiliated-ultra-wideband communication devices (or at least two ultra-wideband antennas) are present. In this case, for example a phase shift in the signal acquired by means of these two communication devices or antennas can be taken as a basis for inferring the distance of the transmitter.

In one expedient method variant, the ultra-wideband communication connection is taken as a basis for ascertaining a motion trajectory of the hearing apparatuses relative to the restricted-admission area. This can be accomplished for example on the basis of multiple successive signal propagation time measurements and/or by means of multiple antennas associated with the restricted-admission area. However, comparison of the distance of the two hearing apparatuses from the restricted-admission area can also be used to infer the motion trajectory, in particular by considering the time characteristic of the two distance values. In this case, the admission restriction is lifted, or at least one other measure is taken, in particular when the motion trajectory corresponds to a stored specification. By way of example, if the restricted-admission area is a residence or a motor vehicle, a so-called "return home function" can be activated if it is detected that the hearing apparatuses are moving toward the residence door or toward a particular door of the motor vehicle. By way of example, this return home function may initially comprise only activating lighting without lifting the admission restriction (in this case unlocking the door). The latter action then takes place for example only when an additional approach is registered.

In one expedient method variant, the narrowband communication device (in particular both of the respective apparatus and of the restricted-admission area) used is a communication interface configured according to the Bluetooth standard, preferably Bluetooth Low Energy. This is an established standard that many devices use to communicate with one another, sometimes even hearing aids to communicate with control units, smartphones or the like.

As already indicated hereinabove, in one expedient method variant, multiple antennas at a physical distance from one another are used for the area-affiliated ultra-wideband communication device. This allows comparatively high spatial resolution for locating the hearing apparatuses to be easily attained. This is advantageous in the case of a motor vehicle, for example, in particular for detecting which door the hearing apparatuses are in front of and also—as the hearing apparatuses (or at least one of these hearing apparatuses) in this case act as a digital vehicle key, more precisely keep said digital vehicle key in stored form—whether the hearing apparatuses are inside the motor vehicle.

Additionally, multiple antennas can also be used to detect a comparatively small movement of the hearing apparatuses themselves. By way of example, a (body) movement of a person using the hearing apparatus can be detected and used as a criterion for opening the restricted-admission area.

In another expedient method variant, the two hearing apparatuses used are (two) hearing aids, optionally a pair of binaurally operating hearing aids, each having an ultra-wideband communication device. In this case (but also independently of the use of the hearing aids as hearing instruments), the distance of each hearing aid (hearing instrument) from the restricted-admission area is ascertained. This is then used to infer a movement, preferably a body movement, of the person wearing the hearing aids, said movement being compared with a reference (head) movement stored for lifting the admission restriction. The admission restriction is then in particular lifted if the (head) movement corresponds to the reference (head) movement or is sufficiently similar thereto. The reference movement used here is in particular a movement sequence, that is to say not only a movement in one direction. By way of example, one such reference (head) movement used may be bowing of the upper body, in the case of the head movement in particular nodding or the like. In this case, merely approaching the restricted-admission area is therefore not sufficient (anymore), but rather an "extra" (i.e. in particular an additional criterion, preferably the head movement described hereinabove) is required, which in turn increases security. The use of the two hearing instruments or hearing aids permits particularly precise results for detection of the (head) movement.

In one preferred method variant, the admission restriction is lifted by unlocking a door lock for the area.

In one expedient method variant, as already described hereinabove, the other measure is activating a lighting of the restricted-admission area.

A bandwidth of the communication signal of at least 500 MHz and/or of at least 20% of a center frequency is preferably used for the ultra-wideband communication connection. Center frequency is intended to be understood to mean in particular the median value from the upper and lower cutoff frequencies of the applicable frequency band. By contrast, conventional radio techniques intended for such purposes (narrowband radio or narrowband communication) use much narrower, in particular less than half in terms of size, frequency widths (WLAN for example with a maximum of approximately 160 MHz in the 5 GHz band, otherwise less than 100 MHz; Bluetooth, also with below 100 MHZ). Additionally, the ultra-wideband transceiver is preferably configured to transmit only single signal pulses (preferably in the region of less than 10 ns, in some cases in the region around 1 ns). In contrast to conventional radio engineering (in particular WLAN and Bluetooth), this uses no modulation of a carrier signal, specifically the carrier frequency thereof, but rather in particular so-called pulse modulation techniques.

The admission control system according to the invention has an area-affiliated controller for at least temporarily opening the admission restriction for the restricted-admission area, and the aforementioned hearing apparatuses. The restricted-admission area, optionally the controller thereof, and the hearing apparatuses each have the ultra-wideband communication device and the narrowband communication device. The hearing apparatuses have the hearing-apparatus-affiliated controller. Both (that is to say the area-affiliated and hearing-apparatus-affiliated, that is to say more precisely the three) controllers are configured to carry out the admission control method described hereinabove under a common communication connection.

The hearing apparatus according to the invention, which is formed in particular by a hearing aid, has the aforementioned ultra-wideband communication device and the narrowband communication device and also the controller. Additionally, the hearing apparatus is configured—in particular by means of a program appropriately stored on the controller—for use in an admission control system of the type described hereinabove.

The controller is preferably (in each case) a microcontroller having an associated data memory on which software (in particular the aforementioned program) is installed so as to be executable, said software in turn having program code that, when executed on the microcontroller, causes said microcontroller to carry out the method described hereinabove. Optionally, the controller may also have an ASIC on which the program is implemented in terms of circuitry.

Exemplary elements of the invention are explained more thoroughly hereinbelow with reference to a drawing.

DETAILED DESCRIPTION OF THE INVENTION

Mutually corresponding parts are provided with the same reference signs throughout the figures.

Figure 1:
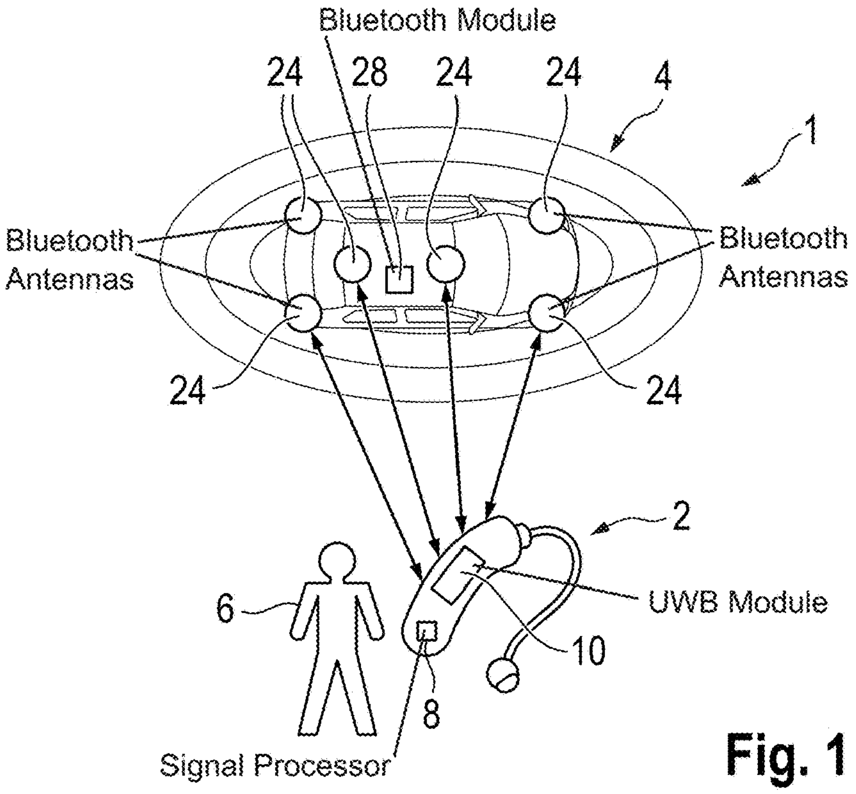
FIG. 1 shows a schematic outline drawing of an admission control system.
Figure 4:
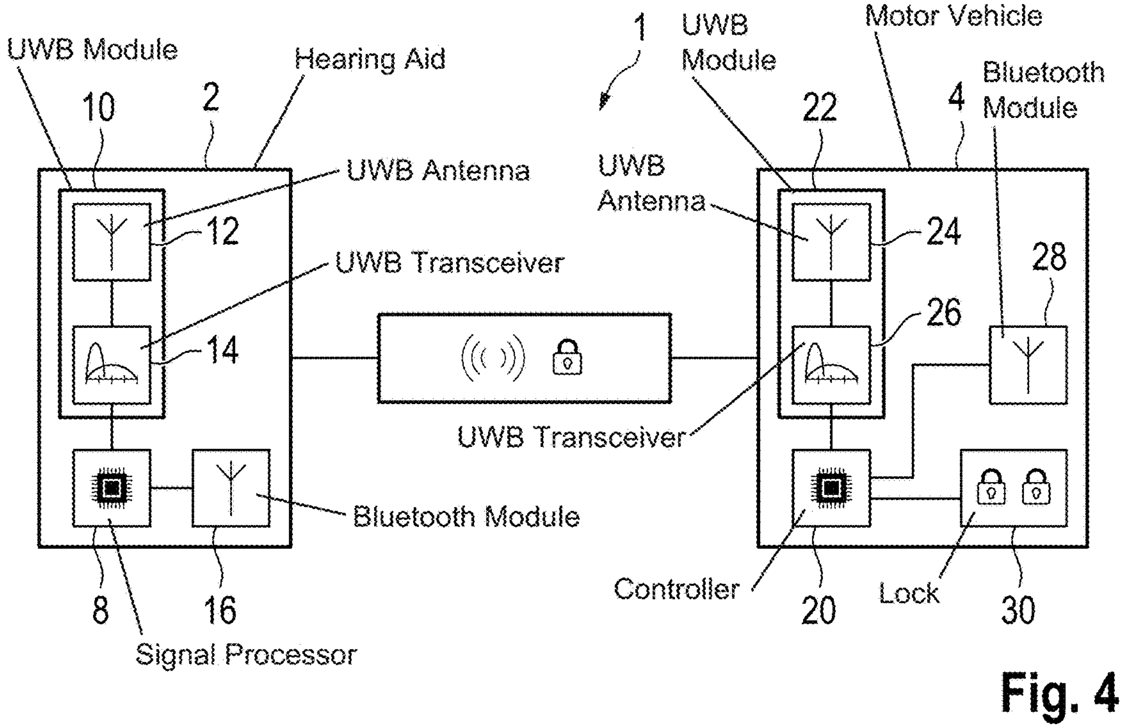
FIG. 4 shows a schematic block diagram of the admission control system.

FIG. 1 shows an admission control system 1 by way of illustration. The admission control system 1 in this exemplary embodiment has a hearing apparatus, here a hearing aid (shortened to: "hearing aid 2") by way of illustration, and a motor vehicle 4. This hearing aid 2 is representative of a pair of these hearing aids 2 by way of illustration. The motor vehicle 4 is a restricted-admission area, because the motor vehicle 4 can be opened and/or driven only by an authorized person 6 (here the person 6 wearing the hearing aid 2). FIG. 4 shows a schematic block diagram of the components of the admission control system 1.

Besides a signal processor 8, which forms a controller, the hearing aid 2 has an ultra-wideband communication device (shortened to: "UWB module 10") that comprises a UWB antenna 12 and a UWB transceiver 14. In addition, the hearing aid 2 has a narrowband communication device, here a communication interface in the form of a Bluetooth module 16. The restricted-admission area has a controller 20 and a UWB module 22 having at least one UWB antenna 24 and a UWB transceiver 26. The restricted-admission area also has a Bluetooth module 28. Additionally, the restricted-admission area has an opening module, in the case of FIG. 1 a lock 30.

Figure 2:
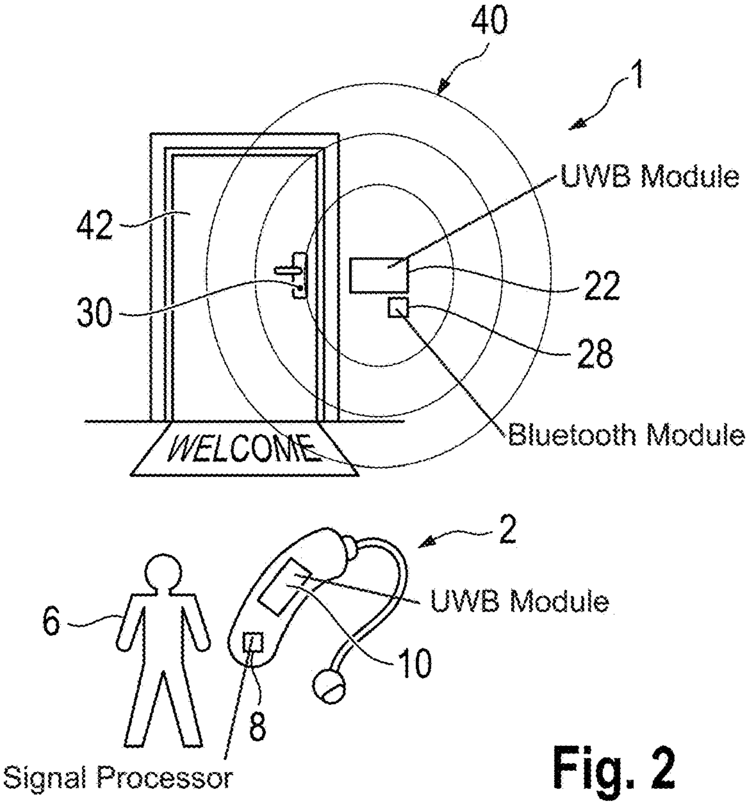
FIG. 2 shows a view based on FIG. 1 of another exemplary embodiment of the admission control system.

FIG. 2 shows an alternative exemplary embodiment of the admission control system 1. The restricted-admission area in this case is formed by a residence 40 that has a lockable—in the restricted state a locked—door 42.

Figure 3:
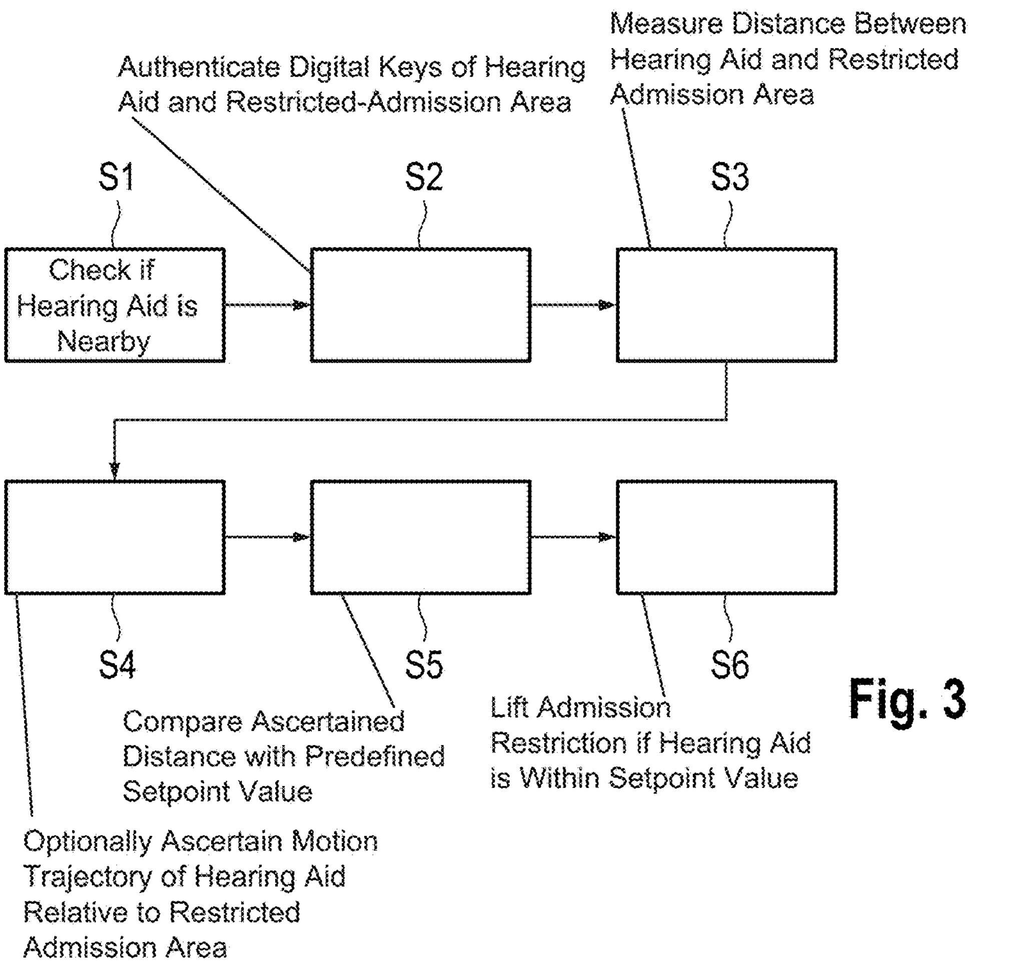
FIG. 3 shows a schematic flowchart for a method that is carried out by the admission control system.

The admission control system 1 is used to carry out an admission control method, which is described more thoroughly hereinbelow with reference to FIG. 3, in order to open admission to the restricted-admission area for an authorized person. In a first method step S1, the area-affiliated Bluetooth module 28 is used to check whether the hearing aid 2 is nearby. The presence of the hearing aid 2 is detected for example on the basis of a response from the hearing aid 2 by means of the Bluetooth module 16 thereof, optionally also on the basis of a successful coupling of the Bluetooth module 10 to the Bluetooth module 28.

In a second method step S2, a respective digital key of the restricted-admission area, that is to say for example the motor vehicle 4 or the residence 40, and the hearing aid 2 is then authenticated. This is accomplished by exchanging the digital keys, for example. This can optionally be done by means of Bluetooth or also by means of a UWB communication connection already. If the digital keys are correct, that is to say authenticated, a third method step S3 comprises performing a distance measurement by means of the UWB communication connection between the hearing aid 2 and the restricted-admission area (that is to say the motor vehicle 4 or the residence 40). This distance measurement is performed on the basis of a propagation time measurement for the UWB signal from the hearing aid 2 to the motor vehicle 4 or to the residence 40. In a fourth method step S4, a motion trajectory of the hearing aid 2 relative to the restricted-admission area is optionally also ascertained, that is to say for example whether the hearing aid 2 (that is to say in particular the person 6 wearing the hearing aid 2) is moving past the motor vehicle 4. This is accomplished by evaluating multiple successive distance measurements and/or—in the case of the motor vehicle 4, which has multiple UWB antennas 24—multiple simultaneous distance measurements.

In a fifth method step S5, the ascertained distance (value) is compared with a predefined setpoint value. If the hearing aid 2 is within the setpoint value, a sixth method step S6 comprises lifting the admission restriction on the area, that is to say unlocking the motor vehicle 4 or the lock 30 of the door 42.

Optionally, a subsequent method step in the case of the motor vehicle 4 can comprise checking whether the hearing aid 2 is also inside the motor vehicle 4 before an ignition, engine immobilizer, engine start or the like is enabled.

The subject matter of the invention is not limited to the exemplary embodiments described hereinabove. Rather, other embodiments of the invention can be derived from the above description by a person skilled in the art. In particular, the individual features of the invention that are described with reference to the various exemplary embodiments, and the design variants of said invention, can also be combined with one another in a different way.

LIST OF REFERENCE SIGNS

1 admission control system
2 hearing aid
4 motor vehicle
6 person
8 signal processor
10 UWB module
12 UWB antenna
14 UWB transceiver
16 Bluetooth module
20 controller
22 UWB module
24 UWB antenna
26 UWB transceiver
28 Bluetooth module
30 lock
40 residence

42 door

S1-S5 method step

The invention claimed is:

1. An admission control method for a restricted-admission area, the method comprising:

providing two hearing apparatuses each having a respective ultra-wideband communication device and a respective narrowband communication device;

using an area-affiliated narrowband communication device to check for a presence of the hearing apparatuses;

upon detecting the presence of the hearing apparatuses, establishing an ultra-wideband communication connection between an area-affiliated ultra-wideband communication device and the ultra-wideband communication devices of the hearing apparatuses;

checking for an admission authorization associated with the hearing apparatuses;

taking the ultra-wideband communication connection as a basis for ascertaining a distance of the hearing apparatuses from the restricted-admission area;

upon an existence of the admission authorization of the hearing apparatuses and a presence of the hearing apparatus within a predefined distance from the restricted-admission area, at least temporarily lifting the admission restriction; and deriving a head movement of a person wearing the hearing apparatuses from the distance of each of the hearing apparatuses from the restricted-admission area, and comparing the head movement of the person to a reference head movement stored for lifting the admission restriction.

2. The admission control method according to claim 1, which further comprises providing two hearing aids as the two hearing apparatuses.

3. The admission control method according to claim 1, which further comprises ascertaining the distance of the hearing apparatuses from the restricted-admission area by using a signal propagation time measurement or a signal angle of arrival.

4. The admission control method according to claim 1, which further comprises using the ultra-wideband communication connection as a basis for ascertaining a motion trajectory of the hearing apparatuses relative to the restricted-admission area, and lifting the admission restriction or taking at least one other measure upon the motion trajectory corresponding to a stored specification.

5. The admission control method according to claim 1, which further comprises using a communication interface configured according to the Bluetooth standard as the narrowband communication device.

6. The admission control method according to claim 1, which further comprises using a plurality of antennas disposed at a physical distance from one another for the area-affiliated ultra-wideband communication device.

7. The admission control method according to claim 1, which further comprises lifting the admission restriction by unlocking a door lock for the area.

8. The admission control method according to claim 4, which further comprises activating lighting of the restricted-admission area as the at least one other measure.

9. The admission control method according to claim 1, which further comprises using at least one of:

a power draw of less than 2 mW, for the ultra-wideband communication device, or a bandwidth of at least one of at least 500 MHz or at least 20% of a center frequency, for the ultra-wideband communication connection.

10. The admission control method according to claim 9, which further comprises using a power draw of less than 1.5 mW, for the ultra-wideband communication device.

11. The admission control method according to claim 9, which further comprises using a power draw of less than 1 mW, for the ultra-wideband communication device.

12. An admission control system, comprising:

an area-affiliated controller for at least temporarily opening an admission restriction for a restricted-admission area; and two hearing apparatuses;

the restricted-admission area and the hearing apparatuses each having a respective ultra-wideband communication device and a respective narrowband communication device;

the hearing apparatuses each having a respective hearing-apparatus-affiliated controller; and the controllers being configured to carry out the method according to claim 1 under a common communication connection.

13. The admission control system according to claim 12, wherein the two hearing apparatuses are two hearing aids.

14. A hearing apparatus or hearing aid, comprising:

an ultra-wideband communication device;

a narrowband communication device; and a controller configured for use in the admission control system according to claim 12.

15. The admission control method according to claim 1, which further comprises identifying nodding as the head movement.

* * * * *